Feb. 13, 1968   J. T. BARTON   3,368,253
PIPE LINING TROWEL
Filed Nov. 22, 1965   2 Sheets-Sheet 2
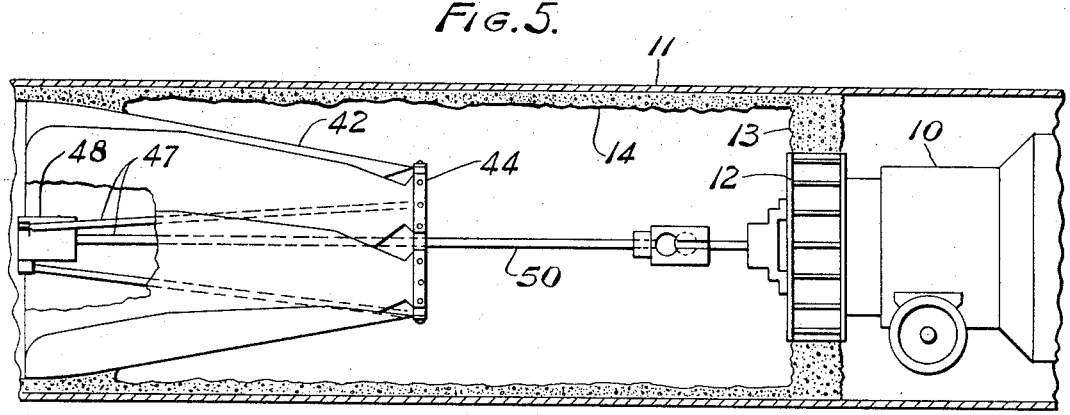
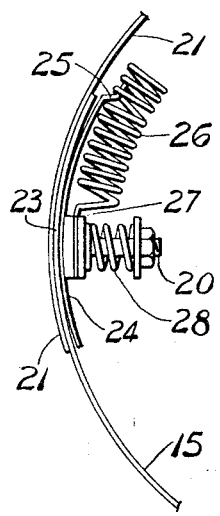
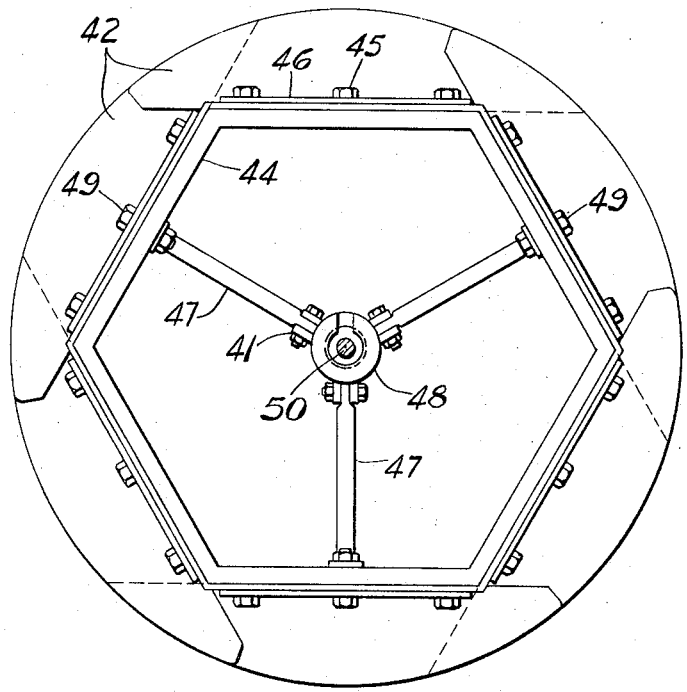
INVENTOR.
JOHN T. BARTON
BY
Christel + Bean
ATTORNEYS

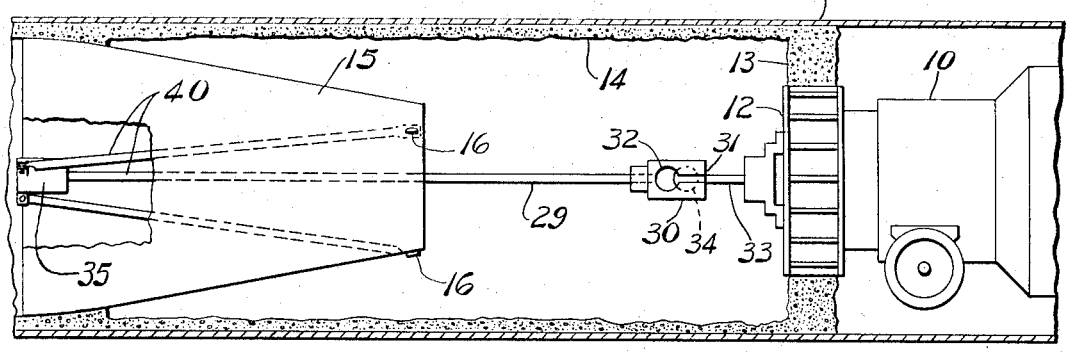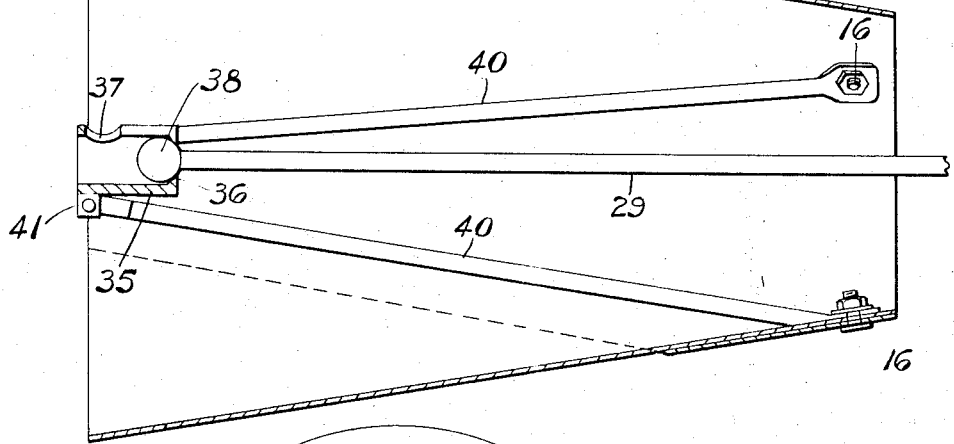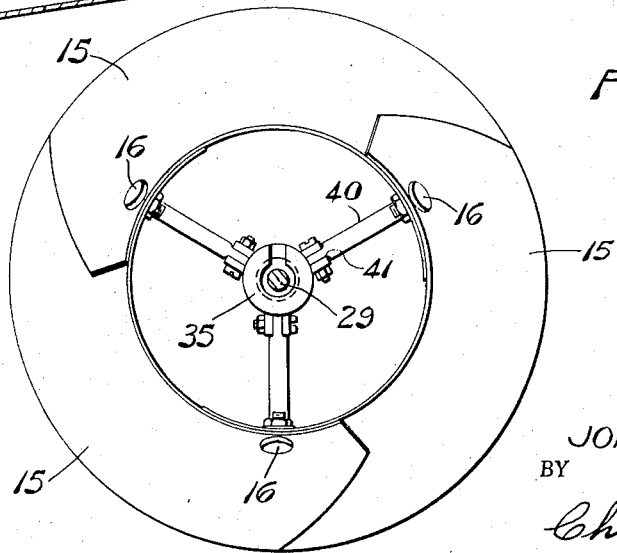

United States Patent Office 3,368,253
Patented Feb. 13, 1968

3,368,253
PIPE LINING TROWEL
John T. Barton, Montour Falls, N.Y., assignor to Perkins
Pipe Linings, Inc., Grand Island, N.Y.
Filed Nov. 22, 1965, Ser. No. 508,958
10 Claims. (Cl. 25—38)

This invention relates generally to apparatus for applying a protective coating of mortar or similar material in plastic condition to the interior walls of pipes, conduits and the like, and more particularly to a trowel for troweling the coating after it has been applied in a manner which will insure a smooth uniform coating at all peripheral interior wall portions of the pipes as the trowel is drawn therethrough.

Apparatus for applying a lining of mortar or other plastic surfacing material to the interiors of pipe lines in place in the ground is well known in the art and generally comprises a machine which travels through the pipe while distributing a coating of lining material to the interior of the pipe. Likewise, devices for troweling the rough coated surface after the coating has been applied to the interior walls of pipes are known, an exaxmple of which is disclosed in Letters Patent No. 3,188,710 dated June 15, 1965.

A type of troweling device which is widely used is known in the art as a "drag" trowel and consists of a generally conical trowel adapted to be drawn through an underground pipe behind the coating applying machine, thus troweling the newly applied mortar coating into a smooth internal cylindrical surface. Trowels of this type are, in general, frusto-conically shaped with their larger end resiliently expandable and contractable in diameter and their smaller leading ends providing the point of connection between the trowel and the coating apparatus applying machine or other traction means.

The resiliency of the large end of the trowel accommodates the trowel to changing local conditions within the pipe, including variations in the thickness of the applied coating and temporary distortions in the pipe, such as non-circular cross-sections, and further adapts the trowel to pass over projections at the interior surface of the pipe. Expansion springs or the like are used to provide resiliency to the larger diameter trailing end of the trowel to cause the exterior thereof to bear against the applied mortar at the interior surface of the pipe and to accommodate the trowel to pipe distortions. Also, the resilience of such large end of the trowel produces a yieldable troweling pressure against the mortar.

Since trowels of the above type are drawn through pipes under conditions such that the operation of the trowel cannot be observed and wherein necessary adjustments cannot be readily made, the necessity of providing a trowel which travels accurately through the pipe and performs the designed functions efficiently and consistently under varying conditions is apparent.

Under certain conditions, a problem occurs when the coating machine draws the trowel through the pipe, due to deviations in the extent of the axis of the trowel body. Due to various factors the trowel axis diverges from the axis of the pipe being lined and this causes the larger diameter mortar-engaging portion of the conically shaped trowel to vary its attitude with respect to the interior cylindrical surface of the pipe at different circumferential portions thereof and results in varying angles of attack of the external sides of the cone against the mortar surface at the peripheral mortar-engaging portions of the trowel.

This angular divergence is evidenced by a lateral wandering of the point of connection between the pipe lining machine and the trowel, which point is, in presently known drag trowels, located at the small leading end of the trowel. As the coating machine wanders from side to side or up the wall of a pipe in its travel through a pipe or becomes canted with respect to the longitudinal axis of the pipe, this point of connection is moved laterally and axially offsets the small leading end of the trowel from the axis of the pipe, producing a non-uniform peripheral angle of attack of the troweling surfaces with respect to the mortar at the interior surface of the pipe at various portions about the periphery thereof, resulting in an inefficiently and an ineffectively troweled surface.

This variation in the angle of troweling results in variations in the surface texture of the applied coating at different peripheral portions of the interior of the pipe. An angle of attack of the trowel which is too great relative to the interior surface of the pipe results in a troweled surface having rough edges and a scraped surface. An angle of attack which is too small results in troweling pressure being distributed over an abnormally large area. This produces a troweled surface wherein only the high spots are troweled and pitting of the surface and voids therein are objectionably present. Both of these improper troweling actions reduce the flow efficiency in the pipes to a marked degree, due to turbulence and skin-friction. Abnormal wear of the lining may also result. The combination of such unsatisfactory troweled surfaces at different peripheral portions of the same cross section of the pipe compounds the problem and may lead to a very high and undesirable turbulence and rotary flow, reducing the efficiency of fluid flow and in general shortening the wear life of the pipe lining.

The arrangement and construction of the present invention is such as to provide a trowel connected to and drawn behind a pipe lining machine which will provide a uniform smoothly troweled surface regardless of irregular movements of the pipe lining machine through the pipe. The trowel of the present invention provides means to maintain a constant predetermined angle of attack of the trowel relative to the interior surface of the pipe at all circumferential portions thereof as the trowel is drawn through the pipe during the pipe lining operation. The trowel employed is of simple construction and requires no external manipulation once the trowel is placed in the pipe. The troweling surfaces tend to maintain a constant angle of attack with respect to the mortar and thus produce a constant and uniformly troweled surface automatically and without being unduly affected by the relative position of the pipe lining machine within the pipe.

The means employed in the present invention to maintain the trowel at a constant predetermined angle of attack with respect to the mortar surface includes a unique trowel suspension wherein the connection between the pipe lining machine and the suspension includes a universal joint disposed adjacent the transverse plane formed by the mortar engaging surfaces of the trowel and coaxial with the trowel body. The cooperation between the mortar engaging surfaces of the trowel, the suspension and the universal joint and in particular the location of the universal joint relative to the troweling surfaces provides forces acting on the trowel as it is drawn through a pipe which will maintain the trowel at a relatively constant predetermined angle of attack with respect to the mortar surface notwithstanding lateral wandering of the pipe lining machine.

Various other novel details of construction and advantages inherent in the pipe lining trowel construction of the present invention are pointed out in detail in conjunction with the following description of typical embodiments of the invention. While two embodiments of the present invention are illustrated in the accompanying drawing and described in the following specification, it is to be understood that such embodiments are by way of example only and to illustrate the principles of the present invention, the scope of which is limited only as defined in the appended claims.

In the drawings:

FIG. 1 is a side elevational view, partly in cross section, of a pipe lining machine drawing one form of the trowel of the present invention through a pipe, a portion of the trowel being broken away;

FIG. 2 is a longitudinal cross sectional view of the trowel of FIG. 1 showing the traction rod and its connection with one form of the trowel suspension adjacent the large end of the frusto-conical trowel;

FIG. 3 is an end elevational view of the trowel of FIGS. 1 and 2 viewed from the small or leading end thereof;

FIG. 4 is a fragmentary end elevational view of one of the conical trowel elements viewed from the large or trailing end thereof, showing expansion means for both forms of trowel for urging the large end to an expanded condition;

FIG. 5 is a view similar to FIG. 1 showing a second form of the trowel of the present invention;

FIG. 6 is an end elevational view of the trowel of FIG. 4 viewed from the small or leading end thereof.

Like characters of reference denote like parts throughout the several figures of the drawings and, referring particularly to FIGS. 1 and 5, the numeral 10 designates a pipe lining machine which may be of the type illustrated and described in the U.S. Letters Patent No. 2,758,352, the machine 10 being adapted to be drawn through a subterranean pipe 11 by a remote winch and cable means or the like, not shown, the movement of the machine 10 being to the right as viewed in FIGS. 1 and 5 during the pipe lining operation.

Mortar or other material in a plastic condition is fed to machine 10 by a flexible conduit, not shown, and is applied to the interior surface of the pipe 11 by a rotary distributor head 12 which discharges the mortar or the like centrifugally as indicated at 13, thereby applying a rough coating 14 of mortar or the like to the interior of the pipe. The thickness of the coating is regulated by the rate of discharge from distributor head 12 and the rate of movement of the machine 10 through the pipe.

The trowel of the present invention, in both forms thereof, is drawn through the pipe 11 by the pipe lining machine 10 and comprises a frusto-conical trowel body having a small leading end and a larger trailing end terminating in resilient, annular, expansible and contractable mortar engaging portions. Individual overlapping trailing trowel plates are provided and, in the form shown in FIGS. 1 through 3, three such trowel plates designated 15 are pivoted to each other adjacent to the small end of the trowel as at 16 whereby the large end of the trowel may expand and contract in diameter by a sort of scissors action of the trowel plates. In FIGS. 5 and 6, six overlapping trowel plates designated 42 have flattened portions at the small end of the trowel body fixed to a hexagonal frame 44 by screws 45 as shown in FIG. 6.

The manner in which the trowel plates in both trowel forms are held in overlapping relation at the large end of the trowel body whereby separation of the overlapping portions is prevented and the plates are resiliently urged in an expanding direction will now be described with particular reference to FIG. 4 which shows the large end of the trowel of FIGS. 1 through 3. At each overlap, a screw 20 has one end welded to the interior surface of an outer overlapping portion 21 of each trowel plate 15. The shank portion of the screw 20 extends radially inwardly through a circumferentially extending slot in an underlying portion 23 of an adjacent trowel plate 15 whereby the overlapping portions 21 and 23 may slide against each other in a circumferential direction.

A bracket 24 is welded to the interior surface of each inner trowel plate 15 and has a slot which is co-extensive with the slot in trowel plate portion 23. Bracket 24 has a flange 25 at one end thereof which connects with one end of extension spring 26. The opposite end of spring 26 connects with the outer overlapping trowel plate portion 21 by connection with a washer 27 on screw 20. Washer 27 is biased toward outer trowel plate portion 21 by a spring 28, thereby maintaining trowel plate portions 21 and 23 of adjacent plates in close intersliding relationship.

The same expansion means may be employed in the embodiment of FIGS. 5 and 6 or, in either embodiment, other expansion devices may be employed such as that shown in my co-pending application Ser. No. 462,644 filed June 9, 1965.

Referring to FIGS. 1 through 3, a rod 29 connects the trowel to the pipe lining machine 10, such connection comprising a tubular member 30 rigidly secured to the end of rod 29 at one end thereof and having a hollow cylindrical interior terminating at the opposite end thereof in an internal annular seat 31 with a reduced diameter opening. A key slot 32 is formed in one side of the tubular extension 30 to receive the end of a rod 33 which extends from pipe lining machine 10 and has a ball formation 34 at its outer end. Ball 34 and the adjacent portion of rod 33 are inserted laterally into key slot 32 and moved to the right as shown in FIG. 1 to cause the ball 34 to engage annular seat 31 to provide a universal pivotal connection.

The connection between the trowel plates 15 and rod 29 includes a tubular member 35 similar to the member 30, having a hollow interior terminating at one end in an annular seat 36 with a reduced diameter opening and a lateral key slot 37. Rod 29 terminates at its trailing end in a ball 38 which, along with the adjacent portion of rod 29, is inserted laterally in key slot 37 and moved to the right as seen in FIG. 2, whereby the ball engages the seat 35, thus providing a universal pivotal connection between the trowel and the trailing end of rod 29.

It is an important feature of this invention that the member 35 is supported on the longitudinal axis of the trowel or, more importantly, the longitudinal axis of the pipe being lined, and so that a diametral plane formed by the large end of the trowel passes through or in the general location of ball 38. Since the troweling ends of the plates 15 engage the mortar over a short distance in an axial direction, the center of the universal joint formed by the ball 38 and member 35 preferably lies within the troweling area. Accordingly, the center of ball 38 should preferably lie a short distance to the right of the large end of the trowel, as viewed in FIG. 2. To support the member 35 in the desired central position in the vicinity of the large end of the trowel, a plurality of diverging rods 40 extend from member 35 to the small leading end of the trowel where the rods are secured either to the trowel plates themselves or to the trowel plate supporting structure. Rods 40 are rigidly connected at their converging ends to lugs 41 which are circumferentially spaced on member 35 and at their opposite ends to the small end of the trowel.

In the trowel form shown in FIGS. 1 through 3, each of the rods 40 has a flattened end secured to the trowel structure by each pivot member 16.

In the trowel form shown in FIGS. 5 and 6, arcuate overlapping trowel plates 42 are flattened at the small end of the frusto-conical trowel body for rigid connection to a mounting member which comprises a polygonal frame 44. A flattened end of each plate 42 is fixed to the exterior of each side of polygonal frame 44 as shown at 46, the number of plates corresponding to the number of sides of the polygon. Each of three rods 47 extends divergently forwardly from a member 48 like the member 35 of the previous embodiment and has a flattened end rigidly connected to an interior face of frame 44 by a bolt 49. A rod 50 similar to rod 29 of the first embodiment has a ball formation for detachable connection with member 48 and extends forwardly for connection to the lining machine as in the previous embodiment.

In this manner, there is provided, in each of the trowel forms, a rod connecting between pipe lining machine and a trowel coupling located substantially centrally of the trowel and adjacent to its rear end. Moreover, this connecting rod is free to follow lateral or canting movements of the pipe lining machine as it is drawn through the pipe 11 while still applying its forward pull to the trowel at a point centrally of a plane adjacent to the circular troweling portion of the trowel. Thus the trowel body is maintained in a constant circumferential troweling angle relative to the interior surface of pipe 11 at all points around the periphery. The trowel will therefore always be centered with respect to the longitudinal axis of the pipe and will at all times trowel the coated inner surface at a circumferentially uniform angle of attack as the trowel is drawn through the pipe throughout the pipe lining operation.

I claim:

1. Trowel means adapted to be drawn through a pipe for smoothing an internal layer of lining material comprising a generally frusto-conical trowel body, a traction member extending forwardly from said trowel body for drawing the same through a pipe small end first, coupling means for connection of said trowel to said traction member, and means connecting between said coupling means and said trowel body for supporting said coupling means substantially axially of said frusto-conical trowel body adjacent to the large end thereof.

2. Trowel means according to claim 1 wherein the connection between said coupling means and said traction means comprises a swivel connection.

3. Trowel means according to claim 1 wherein said trowel body comprises a plurality of laterally overlapping trowel plates compressible diametrically at the large end of said frusto-conical body and resiliently expansible to exert radial troweling pressure.

4. Trowel means according to claim 2 wherein said trowel body comprises a plurality of laterally overlapping trowel plates compressible diametrically at the large end of said frusto-conical body and resiliently expansible to exert radial troweling pressure.

5. Trowel means according to claim 2 wherein said connecting means extends from said coupling means to the small leading end of said trowel body for supporting said coupling means from said small end of said trowel.

6. Trowel means according to claim 4 wherein said connecting means extends from said coupling means to the small leading end of said trowel body for supporting said coupling means from said small end of said trowel.

7. Trowel means according to claim 2 wherein said connecting means comprises a plurality of rods extending divergently forwardly from said coupling member to spaced points of connection with the small end of said trowel body.

8. Trowel means according to claim 4 wherein said trowel body comprises a plurality of laterally overlapping trowel plates compressible diametrically at the large end of said frusto-conical body and resiliently expansible to exert radial troweling pressure.

9. Trowel means according to claim 2 wherein said traction means comprises a rod extending from said coupling member to a pipe lining machine disposed forwardly of said trowel means.

10. Trowel means according to claim 1 wherein the connection between said coupling means and said traction means comprises a universal joint.

References Cited

UNITED STATES PATENTS

| 2,924,867 | 2/1960 | Perkins | 25—38 |
| 3,188,710 | 6/1965 | Perkins | 25—38 |
| 3,257,697 | 6/1966 | Ruegsegger | 25—38 |
| 3,257,698 | 6/1966 | Ruegsegger | 25—38 |
| 3,334,389 | 8/1967 | Matheny | 25—38 |

WILLIAM J. STEPHENSON, *Primary Examiner.*